United States Patent [19]
Ito

[11] Patent Number: 5,526,771
[45] Date of Patent: Jun. 18, 1996

[54] ANIMAL EXCREMENT TREATMENT MATERIAL AND METHOD FOR PRODUCING THE SAME

[75] Inventor: Hiroshi Ito, Tokyo, Japan

[73] Assignee: Kabushikikaisha Daiki, Tokyo, Japan

[21] Appl. No.: 122,409

[22] PCT Filed: Feb. 1, 1993

[86] PCT No.: PCT/JP93/00114

§ 371 Date: Nov. 24, 1993

§ 102(e) Date: Nov. 24, 1993

[87] PCT Pub. No.: WO93/14626

PCT Pub. Date: Aug. 5, 1993

[30] Foreign Application Priority Data

Jan. 31, 1992 [JP] Japan .................................. 4-42046
Mar. 19, 1992 [JP] Japan .................................. 4-112040
May 1, 1992 [JP] Japan .................................. 4-157205

[51] Int. Cl.[6] ........................................................ A01K 1/015
[52] U.S. Cl. ............................................ 119/172; 119/171
[58] Field of Search ................................ 119/171, 172, 119/173

[56] References Cited

U.S. PATENT DOCUMENTS 3,059,615 10/1962 Kuceski et al. .......................... 119/171
4,727,824 3/1988 Ducharme et al. ...................... 119/171
4,821,677 4/1989 Harrison ............................... 119/171 X

*Primary Examiner*—Robert P. Swiatek
*Attorney, Agent, or Firm*—Sughrue, Mion, Zinn, Macpeak & Seas

[57] ABSTRACT

An animal excrement treatment material comprising granulated materials mainly containing residues after extract liquid has been extracted from roasted coffee beans, wherein the granulated materials are formed into grains having a grain diameter of 0.1 mm or greater, and wherein at least the surface of the granulated materials are pigmented by pigmenting substances so that the granulated materials are pigmented in a color other than the original color of the residues from extracted coffee beans. This animal excrement treatment material has good absorbency and water retention of urine discharged from animals and makes it possible to mass excrements by wrapping the same so as to facilitate removal or burning of the excrements. In addition, waste residues after extract liquid has been extracted from roasted coffee beans can effectively be used, and furthermore it is also possible to select any color suited to a place where it is used by pigmenting the residues from the extracted coffee beans in any color other than the original color thereof.

28 Claims, 1 Drawing Sheet

ABSTRACT

ANIMAL EXCREMENT TREATMENT MATERIAL AND METHOD FOR PRODUCING THE SAME

FIELD OF THE INVENTION

The invention relates to granulated materials for treating excrements discharged from pet animals including cats and dogs, and method for producing the same, and in particular to such granulated materials and method of producing the same for effectively utilizing residues generated after extract liquid has been extracted from roasted coffee beans.

BACKGROUND OF THE INVENTION

Small grains of sand, bentonire, zeolite, pulp for manufacturing papers, and pulp sludge have been conventionally used as an animal excrement treatment material in particular for use indoors.

Such an animal excrement treatment material is desired to be clean and hygienic because it is usually used indoors, and also desired to be easy to be disposed as waste so that cleanness and hygiene may be maintained. However, inorganic excrement treatment materials such as sand, bentonire, and zeolite is likely to be collapsed into powder when used, and further, even if they emit an offensive odor when long time passed after having been used, they cannot be burned because they are inorganic nor be allowed to dump away into a sewer system. For these reasons, small grains made from pulp for manufacturing papers and paper powder has been used because they have good water absorbency and can be burned in spite of their low deodorant property and higher cost.

With increasing demand for coffee drinks including canned coffee and instant coffee, residues which remain after extract liquid has been extracted from roasted coffee beans, which hereinafter are referred to as merely "the residues", have been generated a lot. In addition, since the residues contain a lot of fat, disposal of the residues costs high. Thus, the effective use of the residues solves the aforementioned problem which the coffee beverage industry has as one of its biggest problems.

However, there arises another problem in using the residues. Pet owners do not like the brown color which is the color of the residues. Since an animal excrement treatment material is usually used indoors, the material is required to have a color which can give sanitary feeling.

It is an object of the present invention to solve the problem that an animal excrement treatment material is decreased in value as a commodity because of the color which the residues have, namely brown.

DISCLOSURE OF THE INVENTION

It is an object of the present invention to provide an animal excrement treatment material which has superior absorbency and retention of urine discharged from animals and can make it possible to mass excrements by surrounding the material so as to facilitate burning of the excrements, and also can advantageously utilize the residues regardless of a color thereof.

In one aspect, an animal excrement treatment material in accordance with the invention mainly contains residues generated after extract liquid has been extracted from roasted coffee beans and is formed into dry grains having diameter not less than 1 millimeter. The material may be pigmented by coating at least a portion of surface thereof with pigmenting substances.

The invention provides a method of producing an animal excrement treatment material including steps of mixing predetermined substance with residues generated after extract liquid has been extracted from roasted coffee beans in less amount than the residues, forming the mixture into grains mainly containing the residues, and drying the grains so that they have water content not more than 10 weight %.

In a preferred embodiment, in the aforementioned mixing step, second substance having germicidal action may be added into the mixture.

In another preferred embodiment, in the aforementioned mixing step, pigmenting substance may be added into the mixture.

In another aspect, the invention provides a method of producing an animal excrement treatment material including steps of mixing predetermined substance with residues generated after extract liquid has been extracted from roasted coffee beans in less amount than the residues, forming the mixture into grains mainly containing the residues, coating the grains at surface thereof with pigmenting substance, and drying the grains.

In a preferred embodiment, in the aforementioned mixing step, second substance having germicidal action may be added into the mixture.

In another preferred embodiment, in the aforementioned mixing step, pigmenting substance may be added into the mixture.

Grains made from the aforementioned residues has coffee smell and contains a lot of fat. Animals such as cats are so sensitive to such coffee smell and fat that it is required to give dry feeling to animals when the grains are used as an excrement treatment material. In addition, it is also required to keep the grains from getting moldy while long preservation of the material, and soften coffee smell emitted from the residues. To this end, in the invention, the grains made from the residues is dried so that they have water content not more than 10 weight %, preferably not more than 5 weight %. Thus, bad feeling of the residues due to coffee smell and fat can be much decreased, so that the coffee smell and fat of the residues do not affect the animal excrement treatment material, even if animals such as cats are sensitive to coffee smell and fat.

Since the animal excrement treatment material mainly contains the residues, the grains made from the residues has brown-colored appearance which is original color of the residues. This brown-colored appearance is not good appearance for indoor use.

Consequently it is preferable in the invention to pigment the residues with pigmenting substance in any color other than the original color thereof. For instance, prior to the step of forming grains, white pigmenting substance may be added into the residues in an amount not more than 40 weight %, preferably not more than 10 weight % based on total weight of the animal excrement treatment material or may be coated on surface of the grains made of the residues so as to pigment the grains in white or nearly white. Thus, the grains may be pigmented in any color other than the original color the residues.

In the invention, the grains can conceal the color of coffee beans by first pigmenting the residues with pigmenting substance and then forming the residues into grains. These grains may be further pigmented. Alternately the grains can conceal the color of coffee beans by first forming the residues into grains and then pigmenting the grains with pigmenting substances.

In the invention, pigment and/or dye may be used as pigmenting substances. For instance, white pigment and/or dye includes paper powder, calcium carbonate, titanium oxide and synthetic pearl, black pigment and/or dye carbon, erio-chromium-black T, amino-black 10B and chlorasol-black BH, blue pigment and/or dye includes quinoline blue, azo blue and patent blue, green pigment and/or dye includes quinoline green and emerald green, and yellow pigment and/or dye includes azo yellow, acid yellow and hansa yellow. Paper powder may be pigmented in advance with pigment or dye to use as pigmenting substances for any color.

Dry grains or pigmented dry grains made from the residues can be used as the animal excrement treatment material without treating any more, however, it is preferred to separate out grains having diameter smaller than 0.1 millimeter for preventing being dusty.

It is preferred to form the animal excrement treatment material in accordance with the invention into grains having diameter not smaller than 1 millimeter for preventing generation of fine grains of the residues. Grains having diameter not smaller than 3 millimeters are more preferred because they are unlikely to scatter out of a box used for animal's toilet, and if they scatter, it is quite easy to gather them whereby hygienic conditions can be maintained. However, it is not prohibited for the animal excrement treatment material may to contain grains having diameter smaller than 1 millimeter or 3 millimeters. The formed grains may be of various shapes including spherical shape, pillar-like shape and particle shape and so on.

In the invention, various substances are added into the dry pigmented grains formed from the residues in order to soften oily property of the residues, enhance stickiness and water absorbency of the grains and facilitate the grains to flow more readily in an extruder. These substances include paper powder, used tea leaves, tofu (bean curd) refuse, small chips of wood, skin of citrus fruits, residues of beet sugar, namely beet pulp, silica gel, pulp for making paper, paper sludge, waste pulp including activated charcoal, pulp sludge, polyvinyl alcohol (PVA) commercially available under the trade name "POVAL", wheat flour, starch, corn starch, carboxymethyl cellulose (CMC), sodium alginate, pullulan, casein and gelatin. These substances may be used alone or in combination of two or more. Alcohol soluble substances include hydroxyethyl cellulose (HEC), hydroxypropyl cellulose (HPC) and polyvinyl pyrrolidone (PVP). These substances may be used alone or in combination of two or more. Gelatinizing agents such as silica gel and gelatin and polyvinyl alcohol are preferable because they act as a binder working for stabilizing solidification of the residues.

High absorbent resin in the form of powder may be added into the animal excrement treatment material in accordance with the invention in order to enhance water absorbency and water retention.

High absorbent resin used in the invention can absorb water in an amount ten to two thousand times as heavy as the resin itself and even so can maintain the initial shape, and includes copolymer saponification of vinyl ester and ethylene-unsaturated carboxylic acid or derivative thereof, graft polymer of starch and acrylic acid, crosslinked polyacrylic acid, copolymer of vinyl alcohol and acrylic acid, partially hydrolyzed polyacrylonitrile, crosslinked carboxymethl cellulose, crosslinked polyethylene glycol, salt of chitin and gel of pullulan. One or more of these high absorbency resin alone may be added, prior to forming grains, into the residues.

In the invention, prior to forming grains, substances such as pigmenting substances in the form of powder may be added into the residues in an amount not more than 40 weight % preferably not more than 10 weight %. Color of the substances is preferably consistent with color of the animal excrement treatment material. When the residues are to be pigmented prior to being formed into grains, color of the substances to be added may be mixed with color of the pigmented residues to make single color or combination color. The pigmented residues are preferably consistent in color with the substances to be added in order to decrease spots.

The substances such as pigmenting substances may be mixed with or merely added into pigmented or nonpigmented residues of coffee beans. Anyway, it is preferable that the substances combine with the residues in the grains.

If pigmenting substances and other substances to be added are all colored in white, color development of indicator can be easily confirmed for inspecting animal excrement. Thus, indicators may be mixed with the residues to inspect animal's physical condition by inspecting animal excrement. Indicators used in the invention for checking animal's physical condition by inspecting animal excrement include, similarly to those conventionally used, indicator for inspecting urine of human, namely urine pH indicator, urine protein indicator, urine sugar indicator, urine haemoglobin indicator and other urine indicators for human.

When aforementioned indicators are to be used in the invention, for the purpose of making it easy to detect color development of the indicators, it is preferable that the dry residues are pigmented in white over entire surfaces thereof and mixture of the indicators and white or nearly white substances is added to the residues. White or nearly white extender substances may be used as pigmenting substances instead of white pigment and dye. Consequently, in addition to the aforementioned pigmenting substances for white-coloring, bentonire, zeolite, mineral substances for white-pigmenting such as calcium carbonate and terra alba, wheat flour, paper powder, pulp powder for making papers, paper slude and CMC may be used as pigmenting substances for pigmenting surfaces of the residues.

When urine pH indicators are used, pigmenting substances are selected among those which do not affect pH. For instance, paper powder or titan white should be used as pigmenting substances.

The dry pigmented grains made of the residues has deodorizing effect to some degree. However, in order to prevent generation of bad smell due to decomposition of urine discharged from animals, the animal excrement treatment material in accordance with invention may include, as auxiliary deodorizer, bentonire in the form of white powder or zeolite each having absorbent property, or pulp waste including activated carbon therein such as waste chips of black charcoal filter for cigarettes in an amount not more than 10 weight %. These auxiliary deodorizers are preferably mixed in the grains.

In the invention, substances having germicidal action may be added into the dry pigmented grains made of the residues in order to keep the grains from getting moldy while preserved without being used. The substances having germicidal action do preferably not have decoloring action, and consequently, suitably include salt, sorbic acid and salt thereof, calcium propionate, hinokitiol, benzoic acid and salt thereof. Calcium hypochlorite may be added when pigment which cannot be easily decolored by oxidation is used as pigmenting substance. Hinokitiol can be added by mixing wood powder of white cedar (hinoki cypress) or leaves thereof which include hinokitiol. By using wood powder or chips including hinokitiol, waste discharged from lumbering factories can be advantageously utilized.

Substance for bonding the residues may be preferably added into the residues in order to mass the residues into which urine has been discharged and facilitate removal of a portion of the residues in contact with urine, or prevent the animal excrement treatment material from powdering when used. The substance for bonding the residues includes paper powder, pulp for making paper, paper sludge, pulp sludge, polyvinyl alcohol (PVA), wheat flour, starch, corn starch, carboxymethl cellulose (CMC), pullulan and gelatin as water soluble substance or substance having tendency of scattering in water. These substances may be used alone or in combination of two or more. In addition, the substance which is alcohol soluble includes hydroxyethl cellulose (HEC), hydroxypropyl cellulose (HPC) and polyvinyl pyrrolidone (PVP). These substances may be used alone or in combination of two or more.

In the animal excrement treatment material in accordance with the invention, high water-absorbency resin may be added into the residues for enhancing water absorbent ability of the material.

In the invention, the residues is formed into grains by means of a grain forming apparatus. Conventional extruder for forming grains may be used as the apparatus. In addition, various grain-forming apparatus may be used such as pan type, drum type or fluidized bed type ones. After grains are formed in the apparatus, the grains may be covered on surfaces thereof with white colored powder or sprayed on surfaces thereof with white colored solution or suspension.

It is preferred that after the grains are formed, substance for bonding the residues, high water absorbency resin and/or substance having germicidal action and other additional substances is (are) adhered to the surfaces of the dry pigmented grains made of the residues and then the grains are dried for preventing removal of these substances.

In the invention, since the animal excrement treatment material is pigmented with pigmenting substances, the original color of coffee beans, namely brown color can be concealed. Consequently the animal excrement treatment material can be colored in any color, which increases value of the material as a commercially available commodity, and thus can be in accord with furnitures in a room, sanitary environment, user's favorite, or colors in a room.

In the invention, the animal excrement treatment material is pigmented with pigmenting substances, animal excrement adhered to the surface of the material can be easily wrapped with the material whereby a stench due to animal excrement can be absorbed into the residues and therefore cannot be spread around.

In addition, the residues has absorbency ability as its inherent property, so that the residues can be used as an animal excrement treatment material without adding thereinto substance having absorbency. Thus, the animal excrement treatment material according to the invention absorbs well urine discharged from animals and deodorizes well. In addition, since the animal excrement treatment material is pigmented with pigmenting substances, color development of indicators mixed in the residues for inspecting animal's urine is quite easy whereby it is quite easy to check physical conditions of animals only by checking the color of urine discharged from animals.

Polyvinyl alcohol and/or wheat flour is(are) preferred to mix with the residues because they tend to adhere to animal excrement to mass them, which facilitates disposal of animal excrement. Furthermore, if auxiliary deodorizer and/or high water-absorbent resin is(are) mixed with the animal excrement treatment material, the material can have greater deodorizing effect, water absorbency and water retention.

According to the invention, combustible waste, how they should be disposed has been quite a problem so far, such as residues discharged after extract liquid has been extracted from coffee beans, used tea leaves, waste pulp containing activated carbon therein, and paper powder can be effectively utilized as an animal excrement treatment material, and furthermore disposal of them by burning is quite easy since they consist mainly of combustible materials.

The animal excrement treatment material in accordance with the invention mainly contains the residues having superior deodorizing effect in the form of grains having diameter longer than 1 millimeter, preferable longer than 3 millimeters, and containing water absorbent substance and/or deodorizer therein. Thus, the material can absorb well urine discharged from animals, retain urine and deodorize urine well.

In addition, the animal excrement treatment material in accordance with the invention may include high water absorbent resin, substances having bonding or adhering the residues such as wheat flour, polyvinyl alcohol, starch or gelatinizing agent, substances having germicidal action or combination thereof, so that the material tends to adhere to animal excrement and mass them to thereby facilitate removal of animal excrement. The material would have superior deodorant effect and water retention effect as an excrement treatment material if the material contains deodorizer and/or water absorbent. Furthermore, the material would be able to be preserved long time without gathering mold if the material contains therein substances having germicidal action.

The above and other objects and advantageous features of the present invention will be made apparent from the following description made with reference to the accompanying drawings.

BEST MODE FOR CARRYING OUT THE INVENTION

Figure 1:
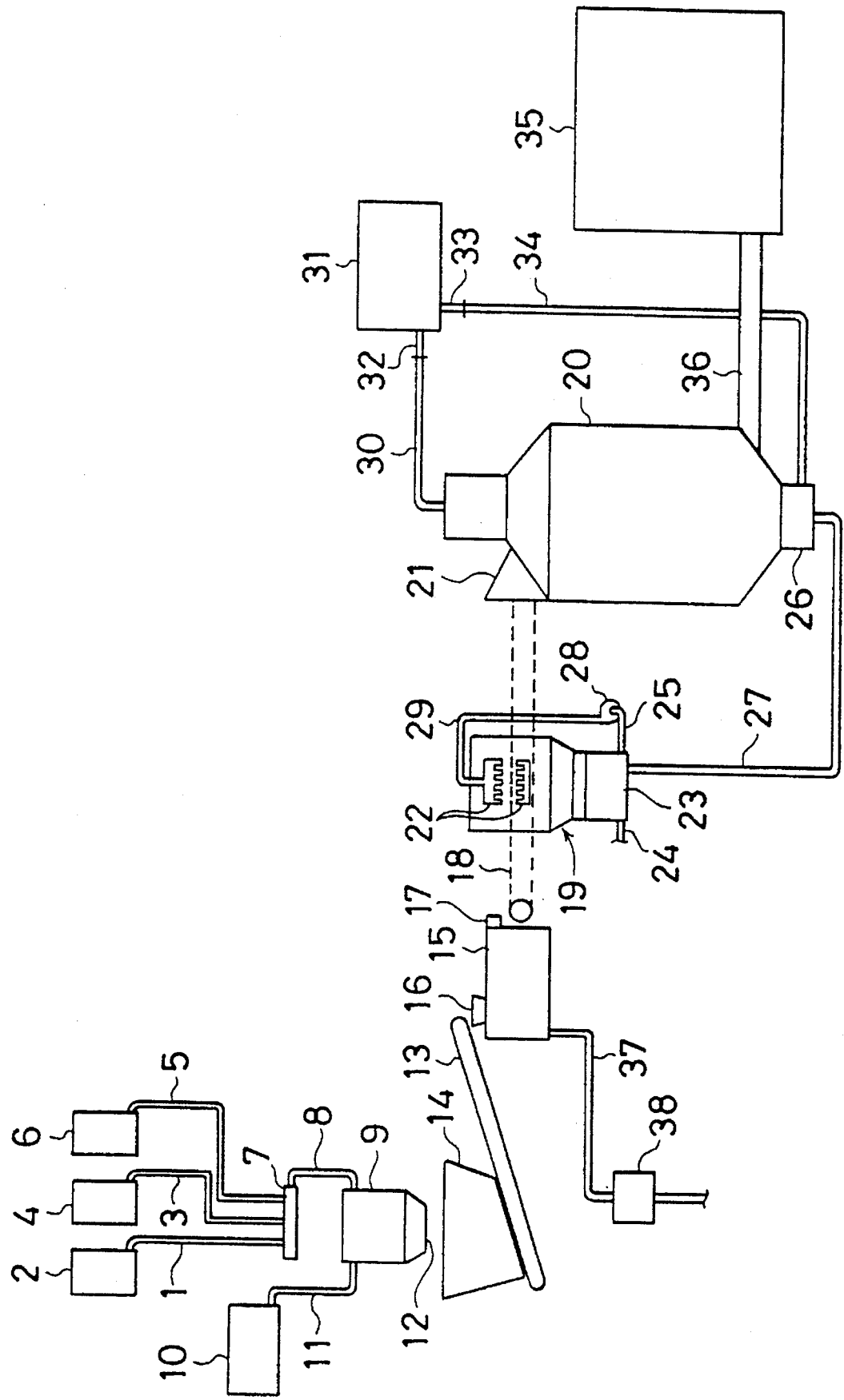
FIG. 1 is a schematic view illustrating an apparatus for forming grains from residues discharged after extract liquid has been extracted from roasted coffee beans, and also illustrating steps of a method for forming such grains which are pigmented.

A preferred embodiment in accordance with the invention will be explained hereinbelow with reference to a drawing. However, this embodiment does never limit the scope of the invention.

FIG. 1 is a schematic view illustrating an apparatus for forming and pigmenting residues discharged after extract liquid has been extracted from roasted coffee beans.

As illustrated in FIG. 1, the apparatus has a source tank 2 containing the residues, a source tank 4 containing pigmenting substance and a source tank 6 containing a predetermined substance to be added to the residues. The tanks 2, 4, 6 have passages 1, 3, 5 extending from bottoms of the tanks 2, 4, 6. The residues, pigmenting substance and predetermined substance are to flow in the passages 1, 3, 5. The passages 1, 3, 5 extend to a passage switching device 7. By switching passages 1, 3, 5 through the passage switching device 7, one or more of the residues, pigmenting substance and predetermined substance may flow into a mixer 9 through a passage 8 connected to an outlet of the device 7.

In this embodiment, one or more of the residues, pigmenting substance and predetermined substance may be introduced into the mixer 9 by means of vacuum force generated by a vacuum producing device 10 in connection with the mixer 9.

The passage 8 extending from the passage switching device 7 and a passage 11 extending from the vacuum producing device 10 are connected to the mixer 9 at an upper portion of the mixer 9.

The mixer 9 has an outlet 12 located at the bottom of the mixer 9 and above a hopper 14. A belt conveyer 13 runs below the hopper 14 to a hopper 16 for a grain forming apparatus 15. In this embodiment, the grain forming apparatus 15 comprises an extruder having dice (not shown) so that grains are formed in thin cylindrical shape having 6.4 millimeters diameter and 12.5 millimeters length. The grains are extruded through a dice outlet 17 of the apparatus 15. Below the outlet 17 is provided a net conveyer 18 for feeding the grains. The net conveyer 18 extends through a sprayer 19 to an inlet 21 of a rotary disc type drier 20.

The sprayer 19 has spraying nozzles 22 directing toward upper and lower surfaces of the net conveyer 18 and thus can spray covering material through the nozzles 22 to the grains being fed on the net conveyer 18. The sprayer 19 has at its bottom 23 an opening 24 through which the covering material is supplied, a passage 25 through which the covering material is fed to the nozzles 22, and a passage 27 connected to the drier 20 at its bottom 26 and through which the covering material is to be fed back from the drier 20. The passage 25 is led to a passage 29 through a pump 28 and then to the nozzles 22.

The covering material supplied through the opening 24, fallen to the bottom 23 without adhering to the grains and fed back to the sprayer 19 through the passage 27 are all absorbed through the pump 28 to feed to the nozzles 22 through the passage 29 and then spray the covering material over the grains through the nozzles 22. After having been sprayed with the covering material in the sprayer 19, the grains are fed from the sprayer 19 to the drier 20 through the net conveyer 18.

An exhaust passage 30 extending from the top of the drier 20 connects with a heater 31 at an inlet 32 thereof, and an outlet 33 of the heater 33 connects with the drier 20 at the bottom 26 thereof through a passage 34 through which heated air is to flow. Thus, exhaust gas discharged from the heater 20 is fed into and heated in the heater 31, and then fed to the bottom 26 of the drier 20 through the passage 34 so as to be circulated for heating in the drier 20.

The drier 20 has a screen (not shown) at the bottom 26 above which a conveyer 36 is provided for feeding dry pigmented grains to a packaging apparatus 35. The passage 27 connects the bottom 26 of the drier 20 with the bottom 23 of the sprayer 19. Powder generated in heating step in the heater 20 and fallen into the bottom 26 through the screen (not shown) are fed to the sprayer 19 to be sprayed again through the nozzles 22 to be coated around the grains.

The apparatus in this embodiment has a structure as aforementioned. In operation, the passage switching device 7 is first operated to introduce the residues from the tank 2 to the mixer 9. Then, the device 7 switched the passages to introduce the pigmenting substance to the mixer 9 from the tank 4 and further introduce the predetermined substance to the mixer 9 from the tank 6. The residues and substances are all mixed with each other in the mixer 9. Thus, the residues are pigmented in a color according to the color of the pigmenting substance such as white, yellow, green or blue.

After pigmenting the residues, the outlet 12 of the mixer 9 is open to fall the pigmented residues into the hopper 14. Then, the pigmented residues are fed through the belt conveyer 13 to the grain forming apparatus 15 through the hopper 16 to be formed into grains. The pigmented grains are fed to the sprayer 19 through the net conveyer 18 to be sprayed with the covering material through the nozzles 22.

Next, the pigmented grains are fed to the rotary disc type drier 20 through the net conveyer 18 to be dried. The dried and pigmented grains having diameter longer than 1 millimeter are fed through the conveyer 36 to the packaging apparatus 35 to be packed.

In this embodiment, the grain forming apparatus 15 is one which can dehydrate the residues. Dehydrated water flows into a drainage 37 and then is purified in a purifier 38.

EXAMPLE 1

Residues, which are discharged after water has added into crushed roasted coffee beans and coffee extract liquid has been extracted, were dried with a heater so that they have water content not more than 10 weight %. Thus obtained dry residues of 1,000 grams, sodium chloride of 50 grams, polyvinyl alcohol of 20 grams, paper powder of 250 grams and water of 800 milliliters were mixed with each other. Thus obtained mixture were extruded through a screen of an extruder having a plurality of openings having 6 millimeters diameter, and then cut out and formed into grains. The grains were dried with a heater so that they have water content not more than 10 weight %, and thus transformed to be pellets having 5 millimeters diameter and 10 millimeters length. These pellets were used as sand for cat excrement.

In indoor environment, 20 times diluted aqueous ammonia at 35 degrees centigrade was added into the sand for use of cat excrement. It was found out that the sand well absorbed aqueous ammonia and smell thereof whereby smell of ammonia could not be caught indoors.

Next, the sand was deposited in 3 centimeters thickness in a box used as .a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

EXAMPLE 2

The residues obtained in the example 1 of 1,000 grams, benzoic acid of 10 grams, "Hymosub 500 (registered trade mark)" of 50 grams which is high water absorbent resin commercially available from Hymo K. K., paper powder of 500 grams and water of 850 milliliters were mixed in a mixer with each other. Thus obtained mixture were extruded through a screen of an extruder having a plurality of openings having 6 millimeters diameter, and then cut out and formed into grains. The grains were dried with a heater so that they have water content not more than 10 weight %, and thus transformed to be pellets having 5 millimeters diameter and 10 millimeters length. These pellets were used as sand for cat excrement.

In indoor environment, 50 milliliters of 20 times diluted aqueous ammonia at 35 degrees centigrade was added into the sand for use of cat excrement. It was found out that the sand well absorbed aqueous ammonia and smell thereof whereby smell of ammonia could not be caught indoors.

Next, the sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

EXAMPLE 3

The residues obtained in the example 1 of 1,000 grams, sodium chloride of 50 grams, "Hymosub 500 (registered trade mark)" of 10 grams, polyvinyl alcohol of 10 grams and water of 1000 milliliters were mixed in a mixer with each other. Thus obtained mixture were extruded through a screen of an extruder having a plurality of openings having 6 millimeters diameter, and then cut out and formed into grains. Then, the grains were sprayed with powder compounds consisting of the mixture of high water absorbent resin, polyvinyl alcohol, sodium chloride and wheat flour, and then dried and thus transformed to be pellets having diameter in the range of 5 to 5.5 millimeters and length in the range of 10 to 12 millimeters. These pellets were used as sand for cat excrement.

In indoor environment, 50 milliliters of 20 times diluted aqueous ammonia at 35 degrees centigrade was added into the sand for use of cat excrement. It was found out that the sand well absorbed aqueous ammonia and smell thereof whereby smell of ammonia could not be caught indoors.

Next, the sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

EXAMPLE 4

The residues obtained in the example 1 of 1,000 grams, sodium chloride of 150 grams, polyvinyl alcohol of 50 grams, paper powder of 200 grams and water of 1000 milliliters were mixed in a mixer with each other. Thus obtained mixture were extruded through a screen of an extruder having a plurality of openings having 6 millimeters diameter, and then cut out and formed into grains. Then, the grains were sprayed with powder compounds consisting of the mixture of high water absorbent resin, polyvinyl alcohol, sodium chloride and wheat flour, and then dried to transform to be pellets having diameter in the range of 5 to 5.5 millimeters and length in the range of 10 to 12 millimeters. These pellets were used as sand for cat excrement.

In indoor environment, 50 milliliters of 20 times diluted aqueous ammonia at 35 degrees centigrade was added into the sand for use of cat excrement. It was found out that the sand well absorbed aqueous ammonia and smell thereof whereby smell of ammonia could not be caught indoors.

Next, the sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

EXAMPLE 5

The residues obtained in the example 1 of 1,000 grams, sodium chloride of 100 grams, polyvinyl alcohol of 50 grams, "Hymosub 500 (registered trade mark)" of 50 grams, paper powder of 300 grams and water of 1000 milliliters were mixed in a mixer with each other. Thus obtained mixture were extruded through a screen of an extruder having a plurality of openings having 6 millimeters diameter, and then cut out and formed into grains. The grains were dried so that they have water content not more than 10 weight %, and thereby formed into pellets most of which have 5 millimeters diameter and 10 millimeters length. These pellets were used as sand for cat excrement.

In indoor environment, 50 milliliters of 20 times diluted aqueous ammonia at 35 degrees centigrade was added into the sand for use of cat excrement. It was found out that the sand well absorbed aqueous ammonia and smell thereof whereby smell of ammonia could not be caught indoors.

Next, the sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

EXAMPLE 6

The residues obtained in the example 1 of 1,000 grams, benzoic acid of 10 grams, "Hymosub 500 (registered trade mark)" of 20 grams, polyvinyl alcohol of 10 grams and pulp sludge of 1000 grams having water content of 60% water were mixed in a mixer with each other. Thus obtained mixture were extruded through a screen of an extruder having a plurality of openings having 6 millimeters diameter, and then cut out and formed into grains. The grains were dried so that they have water content not more than 10 weight %, and thereby formed into pellets most of which have 5 millimeters diameter and 10 millimeters length. These pellets were used as sand for cat excrement.

In indoor environment, 50 milliliters of 20 times diluted aqueous ammonia at 35 degrees centigrade was added into the sand for use of cat excrement. It was found out that the sand well absorbed aqueous ammonia and smell thereof whereby smell of ammonia could not be caught indoors. The sand absorbed aqueous ammonia more than three times as heavy as itself.

Next, the sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

Furthermore, the sand used could be flushed into a water closet without any problem.

In alternative example in which pulp of 400 grams and water of 600 grams were used in place of the pulp sludge of 1000 grams in the example 6 with the rest being kept unchanged, similarly the same result was obtained.

EXAMPLE 7

The residues of 2,250 grams having water content of 60 % were supplied in the tank 2, calcium carbonate as pigmenting substance of 225 grams was supplied in the tank 4, and a predetermined substance consisting of wheat flour of 225 grams, polyvinyl alcohol of 9 grams and sodium chloride of 45 grams was supplied in the tank 6.

Then, first the passages switching apparatus 7 was operated so that the tank 2 is in communication with the mixer 9. After that, the vacuum producing device 10 was operated to produce vacuum force to introduce the residues from the tank 2 to the mixer 9. Then, similarly the passages switching apparatus 7 was operated so that the tank 4 is in communication with the mixer 9, and the pigmenting substance, calcium carbonate, was introduced into the mixer 9 by means of vacuum force produced by the device 10. Finally, the predetermined substance consisting of wheat flour, polyvinyl alcohol, and sodium chloride which has germicidal action was similarly introduced into the mixer 9.

After all the substances were introduced into the mixer 9, the mixer 9 was worked to mix calcium carbonate as pigmenting substance, wheat flour, polyvinyl alcohol and sodium chloride with each other.

The residues mixed with the aforementioned substances having white outlooking with spots scattered therein was then introduced into the hopper 14 through the opening 12 of the mixer 9. Then, the residues pigmented in white were fed into the hopper 16 of the grain forming apparatus 15 via the belt conveyer 13, and formed into thin cylindrical white grains with spots scattered thereon having 6.4 millimeters diameter and 12.5 millimeters length.

The grains were then transferred through the net conveyer 18 to the sprayer 19, in which the grains were sprayed through the nozzles 22 with covering material consisting of calcium carbonate of 20 grams, "Hymosub 500" of 14 grams and polyvinyl alcohol of 1.5 grams.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade was poured into the sand. It was found out that the sand well absorbed aqueous ammonia and smell thereof whereby smell of ammonia could not be sensed indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 8

The residues of 2,000 grams having water content of 60 % were supplied in the tank 2, calcium carbonate as pigmenting substance of 200 grams was supplied in the tank 4, and a predetermined substance consisting of used tea leaves of 200 grams, "Hymosub 500" of 50 grams, starch adhesive of 500 grams was supplied in the tank 6. Similarly to the example 7, the residues, calcium carbonate, used tea leaves, Hymosub and starch adhesive were all introduced into the mixer 9. Then the mixture was formed into grains in the grain forming apparatus, and thus thin cylindrical grains pigmented in white with white spots scattered therein and having 6.4 millimeters diameter and 12.5 millimeters length were obtained.

The grains were then transferred through the net conveyer 18 to the sprayer 19, in which the grains were sprayed through the nozzles 22 with covering material consisting of calcium carbonate of 37 grams, "Hymosub 500" of 13 grams and polyvinyl alcohol of 2.6 grams.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade was poured into the sand. It was found out that the sand well absorbed aqueous ammonia and smell thereof whereby smell of ammonia could not be sensed indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 9

The residues of 2,250 grams having water content of 60 % were supplied in the tank 2, calcium carbonate as pigmenting substance of 250 grams was supplied in the tank 4, and a predetermined substance consisting of used tea leaves of 100 grams and starch adhesive of 500 grams was supplied in the tank 6. Similarly to the example 7, the residues, calcium carbonate, used tea leaves and starch adhesive were all introduced into the mixer 9. Then the mixture was formed into grains in the grain forming apparatus, and thus thin cylindrical grains pigmented in white with white spots scattered therein and having 6.4 millimeters diameter and 12.5 millimeters length were obtained.

The grains were then transferred through the net conveyer 18 to the sprayer 19, in which the grains were sprayed through the nozzles 22 with covering material consisting of calcium carbonate of 23 grams, "Hymosub 500" of 16 grams and polyvinyl alcohol of 2 grams.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade was poured into the sand. It was found out that the sand well absorbed aqueous ammonia and smell thereof whereby smell of ammonia could not be sensed indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 10

The residues of 2,675 grams having water content of 60 % were supplied in the tank 2, calcium carbonate as pigmenting substance of 375 grams was supplied in the tank 4, and a predetermined substance consisting of used tea leaves of 750 grams, polyvinyl alcohol of 75 grams, "Hymosub 500" of 80 grams, wheat flour of 400 grams and benzoic acid of 20 grams was supplied in the tank 6. Similarly to the example 7, the residues, calcium carbonate, used tea leaves, polyvinyl alcohol, Hymosub 500, wheat flour and benzoic acid were all introduced into the mixer 9. Then the mixture was formed into grains in the grain forming apparatus, and thus thin cylindrical grains pigmented in white with white spots scattered therein and having 6.4 millimeters diameter and 12.5 millimeters length were obtained.

The grains were then transferred through the net conveyer 18 to the first sprayer 19, in which the grains were sprayed through the first nozzles 22 with covering material consisting of calcium carbonate of 30 grams, "Hymosub 500" of 22 grams and polyvinyl alcohol of 2.7 grams. Subsequently, the grains were fed to a second sprayer (not shown in FIG. 1), in which the grains were sprayed through second nozzles (also not shown) with covering material consisting of calcium carbonate of 40 grams, "Hymosub 500" of 14 grams and polyvinyl alcohol of 2.9 grams.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade was poured into the sand. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

In the examples 7 to 9, though the grains were sprayed with covering material only once, it would be possible in these examples to spray the grains with covering material two or more times. The rate at which various substances are mixed in covering material can be kept unchanged among first and second or more spraying, or the rate at which pigmenting substances are contained in covering material can be made higher in first spraying than second one whereby pigmenting effect can be enhanced. It should be noted that the rate at which pigmenting substances are contained in covering material might be preferred to be set higher in second spray than first spray for enhancing pigmenting effect.

EXAMPLE 11

The residues of 2,675 grams having water content of 60 % were supplied in the tank 2, calcium carbonate as pigmenting substance of 120 grams was supplied in the tank 4, and a predetermined substance consisting of used tea leaves of 150 grams, polyvinyl alcohol of 15 grams, corn starch of 180 grams, "Hymosub 500" of 60 grams, paper powder of 360 grams and benzoic acid of 5 grams was supplied in the tank 6. Similarly to the example 7, the residues, calcium carbonate, used tea leaves, polyvinyl alcohol, corn starch, Hymosub 500, paper powder and benzoic acid were all introduced into the mixer 9. Then the mixture was formed into grains in the grain forming apparatus, and thus thin cylindrical grains pigmented in white with white spots scattered therein and having 6.4 millimeters diameter and 12.5 millimeters length were obtained.

The grains were then transferred through the net conveyer 18 to the first sprayer 19, in which the grains were sprayed through the first nozzles 22 with covering material consisting of calcium carbonate of 20 grams, "Hymosub 500" of 15 grams and polyvinyl alcohol of 6 grams. Subsequently, the grains were fed to a second sprayer (not shown in FIG. 1), in which the grains were sprayed through second nozzles (also not shown) with covering material consisting of paper powder of 66 grams.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade was poured into the sand. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 12

The residues of 2,675 grams having water content of 60% were supplied in the tank 2, paper powder as pigmenting substance of 360 grams was supplied in the tank 4, and a predetermined substance consisting of used tea leaves of 150 grams, POVAL (polyvinyl alcohol) of 20 grams, corn starch of 180 grams, "Hymosub 500" of 90 grams and benzoic acid of 10 grams was supplied in the tank 6. Similarly to the example 7, the residues, paper powders, used tea leaves, POVAL, corn starch, Hymosub 500 and benzoic acid were all introduced into the mixer 9. Then the mixture was formed into grains in the grain forming apparatus, and thus thin cylindrical grains pigmented in white with white spots scattered therein and having 6.4 millimeters diameter and 12.5 millimeters length were obtained.

The grains were then transferred through the net conveyer 18 to the first sprayer 19, in which the grains were sprayed through the first nozzles 22 with covering material consisting of POVAL and paper powder. Subsequently, the grains were fed to a second sprayer (not shown in FIG. 1), in which the grains were sprayed through second nozzles (also not shown) with covering material consisting of paper powder. In this example, after dried, the grains were coated with 1% solution of BTB as urine pH indicator.

The white pigmented grains covered with the covering material were fed to the rotary disc type drier 20 via the net conveyer 18 to be dried. Among the dried grains, those having diameter equal to or longer than 1 millimeter were separated out and fed out through the conveyer 36. Thus, the grains most of which have 5 millimeters diameter and 10 millimeters length were obtained for use of sand for cat excrement.

In indoor environment, 50 milliliters of 20 times diluted aqueous ammonia at 35 degrees centigrade were poured into the sand. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 13

The residues of 32.5 kilograms having water content of 55% and water of 15 kilograms were supplied in the tank 2, paper powder of 10 kilograms made from wasted diaper and napkin as pigmenting substance was supplied in the tank 4, and a predetermined substance consisting of "Hymosub 500" of 1.5 kilograms and benzoic acid of 2.5 grams was supplied in the tank 6. Similarly to the example 7, the residues, paper powder, Hymosub 500 and benzoic acid were all introduced into the mixer 9. Then, the mixture was transferred to a chopper having an opening having diameter of 6.0 millimeters and a plate having 30 millimeters thickness to form into small cylindrical grains having white spots scattered thereon.

The grains were then transferred through the net conveyer 18 to the first sprayer 19, in which the grains were sprayed through the first nozzles 22 with covering material consisting of paper powder. The paper powder adhered to the grains at surface thereof at 3 weight % relative to the total weight of the grains. The grains sprayed with paper powder were screened to separate out extra powder, and then sprayed with polyvinyl alcohol diluted solution at 1 to 10%. Subsequently, the grains were fed to a second sprayer (not shown in FIG. 1), in which the grains were sprayed through second nozzles (also not shown) with covering material consisting of paper powder. The paper powder adhered to the grains at surface thereof at 5 weight % relative to the total weight of the grains. The grains twice sprayed with paper powder were screened to separate out extra paper powder and other debris, and then sprayed with diluted solution of polyvinyl alcohol at 0.1 to 0.02%. Next, the grains were dried at 100 degrees centigrade in 40 to 50 minutes with the result of water content thereof being decreased to 5 to 7%. Among the dried grains, those having diameter equal to or longer than 1 millimeter were separated out and fed out through the conveyer 36. Thus, the grains most of which have 6 millimeters diameter and 7 millimeters length were obtained by the weight of 35 kilograms for use of sand for cat excrement.

In indoor environment, 50 grams of the sand absorbed 130 grams of artificial urine at room temperature. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 14

The residues of 32.5 kilograms having water content of 60% and water of 15 kilograms were supplied in the tank 2, paper powder of 10 kilograms made from wasted diaper and napkin as pigmenting substance was supplied in the tank 4, and a predetermined substance consisting of "Hymosub 500" of 1 kilogram, wheat flour of 2.5 kilograms and benzoic acid of 2.5 grams was supplied in the tank 6. Similarly to the example 7, the residues, paper powder, Hymosub 500, wheat flour and benzoic acid were all introduced into the mixer 9. Then, the mixture was transferred to a chopper having an opening having diameter of 6.0 millimeters and a plate having 30 millimeters thickness to form into small cylindrical grains having white spots scattered thereon.

The grains were then transferred through the net conveyer 18 to the first sprayer 19, in which the grains were sprayed through the first nozzles 22 with covering material consisting of paper powder. The paper powder adhered to the grains at surface thereof at 3 to 5 weight % relative to the total weight of the grains. The grains sprayed with paper powder were screened to separate out extra powder, and then sprayed with polyvinyl alcohol diluted solution at 1 to 10%. Subsequently, the grains were fed to a second sprayer (not shown in FIG. 1), in which the grains were sprayed through second nozzles (also not shown) with covering material consisting of paper powder. The paper powder adhered to the grains at surface thereof at 3 to 5 weight % relative to the total weight of the grains. The grains twice sprayed with paper powder were screened to separate out extra paper powder and other debris, and then sprayed with diluted solution of polyvinyl alcohol at 0.1 to 0.002%. Next, the grains were dried at 100 degrees centigrade in 40 to 50 minutes with the result of water content thereof being decreased to 5 to 7%. Among the dried grains, those having diameter equal to or longer than 1 millimeter were separated out and fed out through the conveyer 36. Thus, the grains most of which have 6 millimeters diameter and 7 millimeters length were obtained by the weight of 32.5 kilograms for use of sand for cat excrement.

In indoor environment, 50 grams of the sand absorbed 115 grams of artificial urine at room temperature. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 15

The residues of 35 kilograms having water content of 55 and water of 15 kilograms were supplied in the tank 2, and a predetermined substance consisting of beet pulp, namely draff of beet sugar of 5 kilograms, "Hymosub 500" of 3 kilograms and benzoic acid of 10 grams was supplied in the tank 6. Similarly to the example 7, the residues, draff of beet sugar, Hymosub 500 and benzoic acid were all introduced into the mixer 9. Then, the mixture was transferred to a chopper having an opening having diameter of 6.0 millimeters and a plate having 30 millimeters thickness to form into small cylindrical grains having white spots scattered thereon.

The grains were then transferred through the net conveyer 18 to the first sprayer 19, in which the grains were sprayed through the first nozzles 22 with covering material consisting of paper powder. The paper powder adhered to the grains at surface thereof at 3 weight % relative to the total weight of the grains. The grains sprayed with paper powder were screened to separate out extra powder, and then sprayed with polyvinyl alcohol diluted solution at 1 to 10%. Subsequently, the grains were fed to a second sprayer (not shown in FIG. 1), in which the grains were sprayed through second nozzles (also not shown) with covering material consisting of paper powder. The paper powder adhered to the grains at surface thereof at 5 wt % relative to the total weight of the grains. The grains twice sprayed with paper powder were screened to separate out extra paper powder and other debris, and then sprayed with diluted solution of polyvinyl alcohol at 0.1 to 0.002%. Next, the grains were dried at 100 degrees centigrade in 40 to 50 minutes with the result of water content thereof being decreased to 5 to 7% Among the dried grains, those having diameter equal to or longer than 1 millimeter were separated out and fed out through the conveyer 36. Thus, the grains most of which have 6 millimeters diameter and 7 millimeters length were obtained by the weight of 30 kilograms for use of sand for cat excrement.

In indoor environment, 50 grams of the sand absorbed 150 grams of artificial urine at room temperature. It was found out that the sand well absorbed aqueous ammonia and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

After used, a portion of the sand into which cats discharged excrement could be easily removed. In addition, the sand in this example has superior water retention and stench absorption, so that no stench was spread indoors.

EXAMPLE 16

The residues of 17.5 kilograms having water content of 65% and water of 3.6 kilograms were supplied in the tank 2, paper powder of 5 kilograms as pigmenting substance was supplied in the tank 4, and a predetermined substance consisting of "Hymosub 500" of 1 kilogram was supplied in the tank 6. Similarly to the example 7, the residues, paper powder and Hymosub 500 were all introduced into the mixer 9. Then, the mixture was transferred to a chopper having an opening having diameter of 6.0 millimeters to form into small cylindrical grains having white spots scattered thereon.

The grains were then transferred through the net conveyer 18 to the first sprayer 19, in which the grains were sprayed through the first nozzles 22 with covering material consisting of paper powder having diameter equal to or shorter than 0.5 millimeters. The grains sprayed with paper powder were screened to separate out extra powder, and then sprayed with polyvinyl alcohol diluted solution. Subsequently, the grains were fed to a second sprayer (not shown in FIG. 1), in which the grains were sprayed through second nozzles (also not shown) with covering material consisting of paper powder having diameter equal to or shorter than 0.3 millimeters at 90 wt % and "Hymosub 500" at 10 wt %. The grains twice sprayed with paper powder were screened to separate out extra paper powder and other debris, and then sprayed with diluted solution of polyvinyl alcohol. The grains were then transferred to a third sprayer (not shown), in which the grains were sprayed through third nozzles (not shown) with covering material consisting of paper powder having diameter equal to or less than 0.1 millimeters at 85 wt %, "Hymosub 500" at 5 wt % and CMC at 10 wt %. The grains thus sprayed with paper powder three times were screened to separate out extra powder and other debris, and then sprayed with diluted solution of propylene glycol. Next, the grains were dried at 100 degrees centigrade in 40 to 50 minutes with the result of water content thereof being decreased to 9%. Among the dried grains, those having diameter equal to or longer than 1 millimeter were separated out and fed out through the conveyer 36. Thus, the grains most of which have 8 millimeters diameter and 10 millimeters length were obtained for use of sand for cat excrement.

In indoor environment, 300 grams of the sand absorbed 600 grams of salt diluted solution containing ammonia therein at 35 degrees centigrade. It was found out that the sand well absorbed the solution and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

When cat discharged urine into the sand, a small part of the sand flowed away since paper powder sprayed on the surface of the grains are quite fine. However, CMC cooperated with the high water absorbent resin "Hymosub 500" to bind the grains with each other due to flowing away of the sand, so that a portion of the sand into which cats discharged excrement could be easily removed. In addition, the sand in this example has superior water retention and stench absorption, so that no stench was spread indoors.

EXAMPLE 17

The residues of 15 kilograms having water content of 60 and water of 1.5 kilograms were supplied in the tank 2, paper powder of 6 kilograms as pigmenting substance was supplied in the tank 4, and a predetermined substance consisting of "Hymosub 500" of 1 kilogram, used tea leaves of 5 kilograms having water content of 80% and benzoic acid of 10 grams was supplied in the tank 6. Similarly to the example 7, the residues, paper powder, Hymosub 500, used tea leaves and benzoic acid were all introduced into the mixer 9. Then, the mixture was transferred to a chopper having an opening having diameter of 6.0 millimeters to form into small cylindrical grains having white spots scattered thereon.

The grains were then transferred through the net conveyer 18 to the first sprayer 19, in which the grains were sprayed through the first nozzles 22 with covering material consisting of paper powder having diameter equal to or shorter than 0.5 millimeters. The grains sprayed with paper powder were screened to separate out extra powder, and then sprayed with Water. Subsequently, the grains were fed to a second sprayer (not shown in FIG. 1), in which the grains were sprayed through second nozzles (also not shown) with covering material consisting of paper powder having diameter equal to or shorter than 0.3 millimeters at 90 wt % and "Hymosub 500" at 10 wt %. The grains twice sprayed with paper powder were screened to separate out extra paper powder and other debris, and then sprayed with water. The grains were then transferred to a third sprayer (not shown), in which the grains were sprayed through third nozzles (not shown) with covering material consisting of paper powder having diameter equal to or less than 0.1 millimeters at 85 wt %, "Hymosub 500" at 5 wt % and CMC at 10 wt %. The grains thus sprayed with paper powder three times were screened to separate out extra powder and other debris, and then sprayed with diluted solution of propylene glycol. Next, the grains were dried at 100 degrees centigrade in 40 to 50 minutes with the result of water content thereof being decreased to 9%. Among the dried grains, those having diameter equal to or longer than 1 millimeter were separated out and fed out through the conveyer 36. Thus, the grains most of which have 8 millimeters diameter and 10 millimeters length were obtained for use of sand for cat excrement.

In indoor environment, 300 grams of the sand absorbed 600 grams of salt diluted solution containing ammonia therein at 35 degrees centigrade. It was found out that the sand well absorbed the solution and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

When cat discharged urine into the sand, a portion of the sand into which cat discharged urine was uniformly massed into a block without the surface thereof being sticky, so that the block could be easily removed. In addition, the sand in this example has superior water retention and stench absorption, so that no stench was spread indoors.

EXAMPLE 18

The residues of 15 kilograms having water content of 60 and water of 3 kilograms were supplied in the tank 2, paper powder of 5 kilograms as pigmenting substance was supplied in the tank 4, and a predetermined substance consisting of "Hymosub 500" of 1 kilogram and wood powder of white cedar (Japanese cypress) of 5 kilograms was supplied in the tank 6. Similarly to the example 7, the residues, paper powder, Hymosub 500 and wood powder were all introduced into the mixer 9. Then, the mixture was transferred to a chopper having an opening having diameter of 6.0 millimeters to form into small cylindrical grains having white spots scattered thereon.

The grains were then transferred through the net conveyer 18 to the first sprayer 19, in which the grains were sprayed through the first nozzles 22 with covering material consisting of paper powder having diameter equal to or shorter than 0.5 millimeters. The grains sprayed with paper powder were screened to separate out extra powder, and then sprayed with water. Subsequently, the grains were fed to a second sprayer (not shown in FIG. 1), in which the grains were sprayed through second nozzles (also not shown) with covering material consisting of paper powder having diameter equal to or shorter than 0.3 millimeters at 90 wt % and "Hymosub 500" at 10 wt %. The grains twice sprayed with paper powder were screened to separate out extra paper powder and other debris, and then sprayed with water. The grains were then transferred to a third sprayer (not shown), in which the grains were sprayed through third nozzles (not shown) with covering material consisting of paper powder having diameter equal to or less than 0.1 millimeters at 85 wt %, "Hymosub 500" at 5 wt % and CMC at 10 wt %. The grains thus sprayed with paper powder three times were screened to separate out extra powder and other debris, and then sprayed with diluted solution of propylene glycol. Next, the grains were dried at 100 degrees centigrade in 40 to 50 minutes with the result of water content thereof being decreased to 9%. Among the dried grains, those having diameter equal to or longer than 1 millimeter were separated out and fed out through the conveyer 36. Thus, the grains most of which have 8 millimeters diameter and 10 millimeters length were obtained for use of sand for cat excrement.

In indoor environment, 300 grams of the sand absorbed 600 grams of salt diluted solution containing ammonia therein at 35 degrees centigrade. It was found out that the sand well absorbed the solution and smell thereof whereby smell of ammonia could not be sensed at all indoors.

Since the sand has white outlooking, it gives a feeling of cleanliness indoors. The sand was deposited in 3 centimeters thickness in a box used as a toilet for cats. Cats used the sand as a toilet in the same manner as usual. No problem arose.

When cat discharged urine into the sand, a portion of the sand into which cat discharged urine was uniformly massed into a block without the surface thereof being sticky, so that the block could be easily removed. In addition, the sand in this example has superior water retention and stench absorption, so that no stench was spread indoors.

Though pigmenting substance for pigmenting in white was used in all of the aforementioned examples, pigmenting substance for pigmenting in any color other than white can be used alone or in combination of two or more thereof.

INDUSTRIAL APPLICABILITY

The animal excrement treatment material in accordance with the invention mainly contains residues discharged after coffee extract liquid has been extracted from roasted coffee beans and are formed into grains having diameter equal to or longer than 1 millimeter, the residues which were dumped away as waste can be advantageously utilized. In addition, since the residues are combustible, the animal excrement treatment material after used can be easily disposed by burning. Disposal by burning is easier than conventional disposal of the residues.

The animal excrement treatment material in accordance with the invention contains dry grains made of the residues and pigmented at surfaces thereof with pigmenting substance, so that any color for the material can be selected consistently with color of a place where the material is to be used. Thus, a sense of cleanliness as well as consistency with indoor colors can be obtained.

In addition, since the residues have absorbent ability itself, it is easier in the material according to the invention than conventional materials to use indicators for inspecting urine, which facilitates to checking animal's physical condition.

The invention enables wastes, which were difficult to be appropriately disposed, to be advantageously utilized such as the residues, used tea leaves, wood powder or chips and draff of beat sugar. Furthermore, the material is mainly made from combustible substance, and consequently quite easy to be disposed by burning.

In the invention, dry grains made from residues discharged after coffee extract liquid has been extracted from roasted coffee beans are pigmented with pigmenting substance. It should be noted that an amount of pigmenting substance is quite small for pigmenting the grains. In addition, the material after used can be more easily disposed than conventional animal excrement treatment material because the material in accordance with the invention is combustible.

As aforementioned, the invention can solve the problem of disposal of garbage such as coffee beans residues and used tea leaves and incombustibility of conventional animal excrement treatment material to thereby facilitate to effectively utilize resources and reduce cost of manufacturing canned coffee, tea and the like as well as reduce garbage in amount.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An animal excrement treatment material mainly comprising residues remaining after coffee extract liquid has been extracted from roasted coffee beans, said residues being in the form of grains having a water content of not more than 10 wt %.

2. An animal excrement treatment material in accordance with claim 1, wherein said grains further comprise an extender substance, wherein said substance is present in the grains in a smaller amount, on a wt % basis, than the residues to thereby soften the oily property of the residues, enhance stickiness and water absorbency of the grains and facilitate flow of the grains in an extruder.

3. An animal excrement treatment material in accordance with claim 2, wherein said extender substance comprises no more than 10 wt % of said grains.

4. An animal excrement treatment material in accordance with claim 2, wherein said extender is at least one substance selected from the group consisting of paper powder, wood chips, wood powder, residues of beet sugar, skin of citrus fruits, pulp for making paper, waste pulp containing activated charcoal, used tea leaves, pulp sludge, paper sludge, polyvinyl alcohol, wheat flour, tofu (bean curd) refuse, corn starch, carboxymethyl cellulose, gelatin, high water absorbent resin, vinyl ester, starch, carboxymethyl cellulose, bentonite and zeolite.

5. An animal excrement treatment material in accordance with claim 1, wherein said grains further comprise an extender substance and a substance having germicidal action wherein each of said substances is present in said grains in a lesser amount, on a wt % basis, than the residues.

6. An animal excrement treatment material in accordance with claim 5, wherein said substance having germicidal action is at least one substance selected from the group consisting of a germicidal agent, a substance for preventing mold, and an antiseptic substance.

7. An animal excrement treatment material in accordance with claim 5, wherein said substance having germicidal action is at least one substance selected from the group consisting of benzoic acid, one or more salts of benzoic acid sorbic acid, one or more salts of sorbic acid calcium propionate, hinokitiol, sodium hypochlorite and one or more salts of hypochlorite.

8. An animal excrement treatment material in accordance with claim 1, wherein said grains further comprise an extender substance, a substance having germicidal action, and a pigmenting substance wherein each of said substances is present in said grains in a lesser amount, on a wt % basis, than the residues.

9. An animal excrement treatment material in accordance with claim 8, wherein said residues comprise not less than 50 wt % of said grains.

10. An animal excrement treatment material in accordance with claim 1, wherein said residues comprise not less than 30 wt % of said grains.

11. An animal excrement treatment material in accordance with claim 1, wherein said grains have a length equal to or longer than one millimeter.

12. An animal excrement treatment material mainly comprising residues remaining after coffee extract liquid has been extracted from roasted coffee beans, said residues being in the form of pigmented grains having a water content of not more than 10 wt % and having diameters equal to or greater than 1 millimeter, wherein at least a part of said grains is coated with a pigmenting substance.

13. An animal excrement treatment material in accordance with claim 12, wherein said grains have cores comprising said residues and an extender substance, wherein said extender substance is present in said cores in a lesser amount, on a wt % basis, than the residues to thereby soften the oily property of the residues, enhance stickiness and water absorbency of the grains and facilitate flow of the grains in an extruder.

14. An animal excrement treatment material in accordance with claim 13, wherein said pigmenting substance is a substance selected from the group consisting of paper powder, calcium carbonate, titanium oxide and synthetic pearl, carbon, eriochromium-black T, amino-black 10B, chlorasol-black BH, quinoline blue, azo blue, patent blue, quinoline green, emerald green, azo yellow, acid yellow and hansa yellow.

15. An animal excrement treatment material in accordance with claim 13, wherein said extender substance comprises not more than 10 wt % of said pigmented grains.

16. An animal excrement treatment material in accordance with claim 13, wherein said extender substance is at least one substance selected from the group consisting of paper powder, wood chips, wood powder, residues of beet sugar, skin of citrus fruits, pulp for making paper, waste pulp containing activated charcoal, used tea leaves, pulp sludge, paper sludge, polyvinyl alcohol, wheat flour, tofu (bean curd) refuse, corn starch, carboxymethyl cellulose, gelatin, high water absorbent resin, vinyl ester, starch, carboxymethyl cellulose, bentonite and zeolite.

17. An animal excrement treatment material in accordance with claim 12, wherein said grains have cores comprising said residues, an extender substance, and a substance having germicidal action, wherein both of said substances taken together are present in said cores in a lesser amount, on a wt % basis, than the residues.

18. An animal excrement treatment material in accordance with claim 17, wherein said substance having germicidal action is at least one substance selected from the group consisting of a germicidal agent, a substance for preventing mold, and an antiseptic substance.

19. An animal excrement treatment material in accordance with claim 17, wherein said substance having germicidal action is at least one substance selected from the group consisting of benzoic acid, one or more salts of benzoic acid, sorbic acid, one or more salts of sorbic acid, calcium propionate, hinokitiol, sodium hypochlorite and one or more salts of sodium hypochlorite.

20. An animal excrement treatment material in accordance with claim 12, wherein said grains have cores comprising said residues, an extender substance, a substance having germicidal action, and a pigmenting substance, wherein each of said substances is present in said cores in a lesser amount, on a wt % basis, than the residues.

21. An animal excrement treatment material in accordance with claim 20, wherein said residues comprise not less than 50 wt % of said pigmented grains.

22. An animal excrement treatment material in accordance with claims 12, wherein said residues comprise not less than 30 wt % of said pigmented grains.

23. A method of manufacturing an animal excrement treatment material comprising the steps of:

mixing an extender substance with residues remaining after coffee extract liquid has been extracted from roasted coffee beans to form a mixture, wherein said extender substance is present in said mixture in a lesser amount, on a wt % basis, than said residues;

forming grains from said mixture, wherein said grains mainly comprise said residues; and drying said grains so that they have a water content equal to or less than 10 wt %.

24. A method of manufacturing an animal excrement treatment material comprising the steps of:

mixing an additive substance and substance having germicidal action with residues remaining after coffee extract liquid has been extracted from roasted coffee beans to form a mixture, wherein each of said substances is present in said mixture in a lesser amount, on a wt % basis, than said residues;

forming grains from said mixture, wherein said grains mainly comprise, on a wt % basis, said residues; and drying said grains so that they have water content equal to or less than 10 wt %.

25. A method of manufacturing an animal excrement treatment material comprising the steps of:

mixing an additive substance, a substance having germicidal action, and a pigmenting substance with residues remaining after coffee extract liquid has been extracted from roasted coffee beans to form a mixture, wherein each of said substances is present in said grains in a lesser amount, on a wt % basis, than said residues;

forming grains from said mixture, wherein said grains mainly comprise, on a wt % basis said residues; and drying said grains so that they have a water content equal to or less than 10 wt %.

26. A method of manufacturing an animal excrement treatment material comprising the steps of:

mixing an extender substance with residues remaining after coffee extract liquid has been extracted from roasted coffee beans, to form a mixture, wherein said extender substance is present in said mixture in a lesser amount, on a wt % basis, than said residues;

forming grains from said mixture, wherein said grains mainly comprise said residues; and pigmenting said grains by coating the surfaces thereof with a pigmenting substance; and drying said grains.

27. A method of manufacturing an animal excrement treatment material comprising the steps of:

mixing an additive substance and substance having germicidal action with residues remaining after coffee extract liquid has been extracted from roasted coffee beans to form a mixture, wherein each of said substances is present in said mixture in a lesser amount, on a wt % basis, than said residues;

forming grains from said mixture, wherein said grains mainly comprise, on a wt % basis said residues; and pigmenting said grains by coating the surfaces thereof with a pigmenting substance; and drying said grains.

28. A method of manufacturing an animal excrement treatment material comprising the steps of:

mixing an additive substance, a substance having germicidal action, and a pigmenting substance with residues remaining after coffee extract liquid has been extracted from roasted coffee beans to form a mixture, wherein each of said substances is present in said grains in a lesser amount, on a wt % basis, than said residues;

forming grains from said mixture, wherein said grains mainly comprise, on a wt % basis said residues; and pigmenting said grains by coating the surfaces thereof with a pigmenting substance; and drying said grains.

* * * * *